Patented Sept. 2, 1941

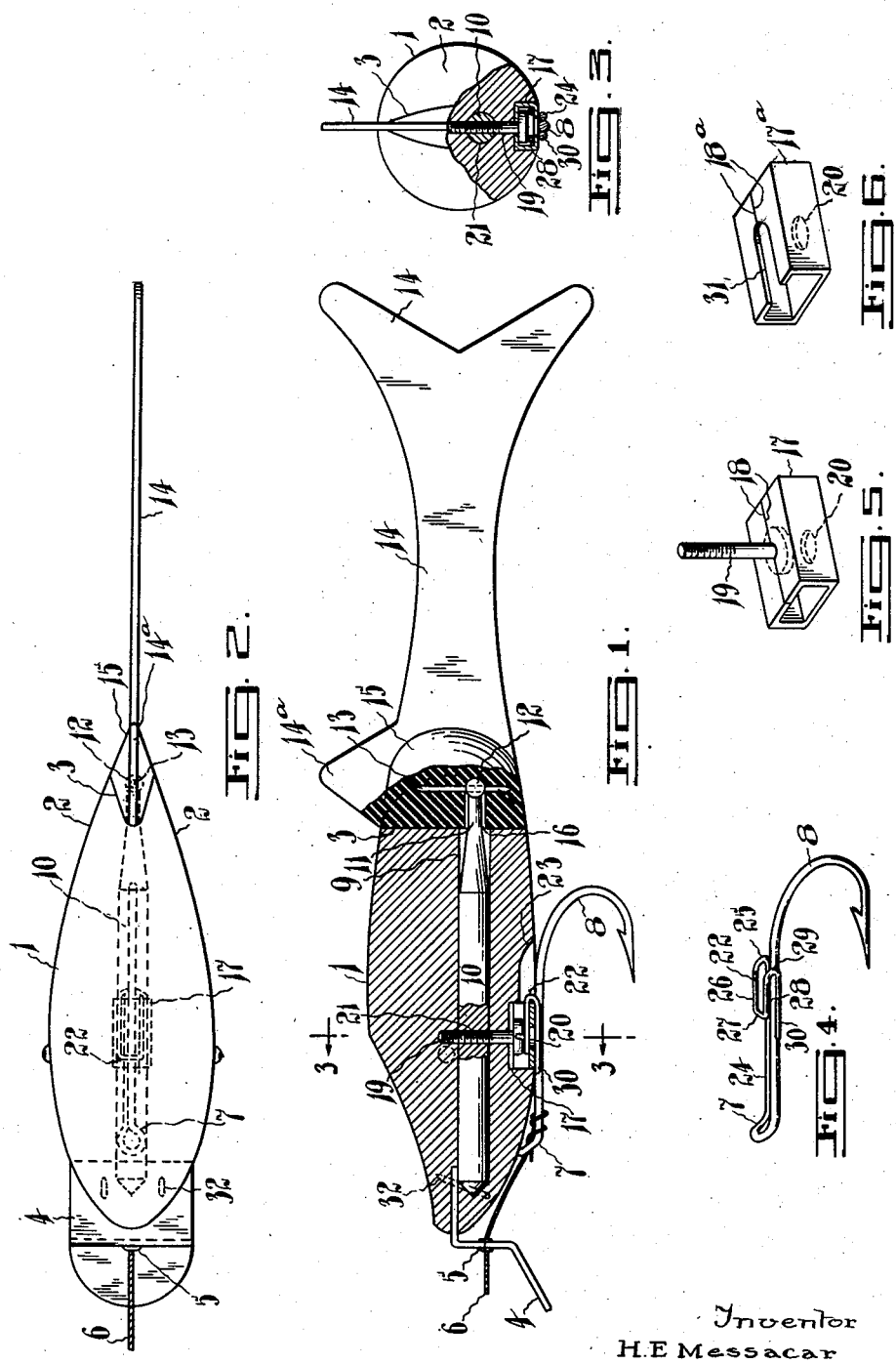

2,254,949

UNITED STATES PATENT OFFICE 2,254,949

ARTIFICIAL FISHING BAIT

Howard E. Messacar, Toronto, Ontario, Canada

Application April 3, 1940, Serial No. 327,547

10 Claims. (Cl. 43—46)

This invention relates to artificial fishing baits or lures of the type similar in appearance to a small fish and my object is to devise a lure of this type in which the movement of the lure through water will simulate more nearly than with known baits the movement and appearance of a small fish, in which the appearance of the lure may be easily and quickly altered to suit different visibility conditions of the water being fished and in which the possibility of a fish disengaging itself from a hook carried by the lure is reduced to a minimum. Other objects I have in mind will appear from the hereinafter detailed description of the invention which is illustrated in the accompanying drawing in which Fig. 1 is a longitudinal section, on an enlarged scale, of my bait or lure;

Fig. 2 a plan view thereof;

Fig. 3 a rear view of the bait, partly in section on the line 3—3 in Fig. 1;

Fig. 4 a perspective view of the hook;

Fig. 5 a perspective view of the preferred form of socket member; and

Fig. 6 a perspective view of a modified form of the socket member.

In the drawing like numerals of reference indicate the corresponding parts in the different figures.

1 is the body portion of the bait which is shaped to simulate a small fish. The sides of the body portion taper at 2 towards the rear end of the body and said end is provided with a substantially V shaped notch 3. At the forward end of the body is carried a plate 4 which extends downwardly and forwardly. In the plate is formed a hole which preferably carries an eyelet 5 through which the line 6 is threaded. The rear end of the line is suitably fastened to a hook 8 which is detachably connected with the body portion 1 as hereinafter described.

The body 1 is made of rigid material which is longitudinally bored at 9 to receive a rod 10 made of material heavier than that of the body. The rod is positioned below the longitudinal axis of the bait to ensure that the latter will not rotate or twist sideways while being pulled through the water. A rear extension 11 of the rod projects rearwardly into the notch 3 and is provided with an eye 12 which carries a pin 13.

The bait is provided with a tail 14 formed of soft flexible material having its forward end substantially V shaped to fit the notch 3. The sides of the tail adjacent the forward end thereof are tapered at 15 to follow the contour of the sides 2 of the body portion 1. Thus the forward end of the tail is substantially diamond shaped in plan and the remainder of the tail is considerably thinner than the forward end so that the tail will readily flex at any point behind the forward end on which a dorsal fin 14a is formed. The forward end of the tail is provided with a transverse recess or groove 16 into which the extension 11 and eye 12 project. Preferably the tail is formed of moulded flexible rubber composition which will stretch sufficiently to enable, first, one end of the pin 13 to be forced into the thickened part of the tail at one side of the recess 16, and then permit the thickened part of the tail at the other side of the recess to be drawn over the other end of the pin 13. The latter will readily bury itself in the rubber upon a slight pressure being applied to the upper and lower edges of the thickened tail part. The tail may be removed from the pin by stretching it first over one end of the pin to disengage it from said end and then over the other end of the pin whereupon the tail will be free of the body portion 1. Tails of various colour combinations may be provided so that the desired colour may be used to attract the fish regardless of whether the water is clear or muddy or the visibility under water is affected by weather conditions. That is to say, in cloudy weather a brighter coloured tail would be used than on a bright day and in muddy water a lighter coloured tail would be used than in clear water.

The underside of the body portion 1 is cut away to receive a tubular socket member 17 which is preferably rectangular in cross section and may be made from a strip of metal having its margins 18 abutted as shown in Fig. 5. These margins are formed with opposite semi-circular notches adapted to be brought into register to embrace the shank of a screw 19 so that the latter may be assembled with the socket member during the formation of the latter. The side of the member opposite the head of the screw is provided with a small opening 20 for the passage of a screw-driver therethrough whereby the screw 19 may be turned to thread it into or out of the body portion. The rod 10 is provided with a transverse threaded hole 21 through which the screw 19 is threaded to secure it and the socket member 17 firmly to the body portion. Preferably the screw extends above the rod to anchor the latter in the body portion so that it cannot be pulled through the bore 9.

On the hook 8 is suitably carried a finger 22 adapted to releasably engage the socket member 17. The underside of the latter does not project beyond the underside of the body 1 and the body is therefore recessed at 23 to provide clearance for the finger 22 whereby it may be readily engaged with or disengaged from the socket member. The finger 22 is formed as a loop and may be integrally formed on the hook 8 in which case the shank of the hook is turned back on itself to form the eye 7 and this turned-back portion 24, which may be of less cross-sectional area than that of the shank, is made of sufficient length to form the looped finger. The latter, in any case, comprises an upwardly and outwardly directed part 25, a rearwardly extending part 26, a transverse part 27, a forwardly extending part 28, a downwardly and inwardly directed part 29, and a rearwardly extending part 30. The part 30 extends along the opposite side of the shank from that on which the portion 24 extends when the hook and finger are formed integral.

Since the hook is secured to the line 6 and the hook may be disengaged from the bait or lure, a fish caught on the hook cannot advantageously employ the bait to free itself from the hook because the latter will move with the fish relative to the bait. I prefer to direct the eye 7 of the hook 8 upwardly so as to lie close to the adjacent portion of the underside of the body 1, in which case the line 6 will be passed through the eye and suitably secured to the shank of the hook.

While the rod 10 balances the body portion 1, the tail 14 serves as a stabilizer. The tail is substantially the same length as the body portion and has its opposite sides similar in contour so that the body will travel evenly through the water although the tail may have an undulatory movement. The flexibility of the tail 14 will permit the tail to lie close to the body portion 1 when the bait is being cast whereby the air resistance is minimized.

The plate 4 is made of light material such as Celluloid, which is not readily seen when the bait is in water, and which is secured to the body 1 by two brads 32 equally spaced from the longitudinal center line. The major portions of the brads are below the horizontal center line of the bait as are the rod 10 and the hook 8.

It will be understood that various modifications of the different parts of my bait may be made without departing from the spirit of my invention. For instance, the opening 20 in the socket member 17 may be of sufficient size to permit the screw head to pass therethrough whereby the screw 19 need not be assembled with the member 17. A modified form 17ᵃ of the socket is shown in Fig. 6 in which the abutted margins 18ᵃ are cut away at one end to form a slot 31 adapted to receive the shank of the screw 19. The socket member 17ᵃ may be secured to the bait by sliding the slot over the screw shank, and then tightening the screw to engage its head with the margins of the slot. If double or treble hooks be employed or if the single hook 8 be shifted rearwardly or forwardly of the position shown in Fig. 1, the weight 10 will be so arranged or constructed to maintain the bait on an even keel. Of course, if it is desired to use a bait which will remain near the surface of the water while being reeled in, the weight of the rod 10 will be decreased by using rods of different materials or sizes. The body 1, if made of wood, will be suitably treated to exclude water from the interior thereof.

What I claim as my invention is:

1. An artificial bait having a body portion provided with a substantially V shaped notch at its rear end; a tail formed of soft flexible material having its forward end received in the notch; a pin; and means connected with the body for embracing the pin intermediate its ends and for positioning it in the notch in spaced relationship to the sides thereof, the forward end of the tail having a recess to receive the said pin embracing means and being adapted to be impaled on the opposite ends of the pin.

2. An artificial bait comprising a body portion; a rod made of material heavier than that of the body portion and carried lengthwise within the latter to balance the bait, the rod having a rear extension provided with an eye; a pin passed through the eye; and a tail formed of stretchable material provided with a recess to receive the extension and adapted to be stretched over the opposite ends of the pin.

3. An artificial bait comprising a body portion; a tubular socket member secured to the body, the latter being cut away at its underside to receive the socket member; a hook adapted to be secured to a line; and a finger carried by the hook for releasably engaging the socket member.

4. An artificial bait comprising a body portion; a rod made of material heavier than that of the body portion and carried lengthwise within the latter to balance the bait, the rod having a transverse threaded hole therethrough; a tubular socket member having an opening through one side; a screw passed through said opening and threaded into the hole for securing the socket member to the body and for anchoring the rod therein; a hook adapted to be secured to a line; and a finger carried by the hook for releasably engaging the socket member.

5. An artificial bait comprising a body portion; a rod made of material heavier than that of the body portion and carried lengthwise within the latter to balance the bait, the rod having a transverse threaded hole therethrough; a tubular socket member having a slot extending from one end of the member towards the other end; a headed screw adapted to pass through the slot and be threaded into the hole, the head of the screw being adapted to engage the margins of the slot to secure the socket member to the rod, the underside of the body portion being cut away to receive the socket member and to permit its withdrawal from the screw when the latter is loosened, the side of the socket member opposite the slotted side having an opening for the passage of a tool therethrough to tighten or loosen the screw; a hook adapted to be secured to a line; and a finger carried by the hook for releasably engaging the socket member.

6. An artificial bait comprising a body portion; a tubular socket member secured to the body, the latter being cut away at its underside to receive the socket member; a hook having an eye for the passage of a line therethrough, the eye being formed by turning back the shank of the hook; and a looped finger formed by extending the said turned back portion and bending it upwardly and outwardly, rearwardly, transversely, forwardly, inwardly and downwardly, and rearwardly to make the loop integral with the hook, the loop being adapted for releasable engagement with the socket member.

7. An artificial bait comprising a body portion; a rod made of material heavier than that of the body portion and carried lengthwise within the latter to balance the bait, a tubular socket member secured to the rod, the underside of the body being cut away to receive the socket member; a hook adapted to be secured to a line; a finger carried by the hook for releasably engaging the socket member, the rod having a rear extension; a pin carried by the extension; and a tail formed of soft flexible material provided with a recess to receive the extension and adapted to be impaled on the opposite ends of the pin.

8. An artificial bait comprising a body portion; a pin carried at the rear end of the body portion in spaced relationship thereto; and a tail formed of soft flexible material having its forward end provided with a transverse recess so that it may be stretched for impalement on the opposite ends of the pin.

9. An artificial bait comprising a body portion; a tail made of soft flexible material; a pin; and means connected with the body for engaging the pin intermediate its ends and for positioning it at the rear end of the body portion, the forward end of the tail having a recess to receive the said pin engaging means and being adapted to be impaled on the opposite ends of the pin.

10. For use with an artificial bait having a rearwardly extending part and a pin carried by said part, a tail made of soft flexible material having its forward end thicker than the remainder of the tail, the said forward end having a recess to receive the rearwardly extending part of the bait and being adapted to be stretched to increase the depth of the recess so that the forward end of the tail may be impaled on opposite ends of the said pin.

HOWARD E. MESSACAR.